(No Model.)

H. LEEMAN.
HORSE DETACHER.

No. 487,126. Patented Nov. 29, 1892.

WITNESSES:
F. McArdle,
E. M. Clark.

INVENTOR:
Henry Leeman
BY
Munn & Co.
ATTORNEYS

UNITED STATES PATENT OFFICE.

HENRY LEEMAN, OF LOUISIANA, MISSOURI.

HORSE-DETACHER.

SPECIFICATION forming part of Letters Patent No. 487,126, dated November 29, 1892.

Application filed June 25, 1892. Serial No. 437,940. (No model.)

*To all whom it may concern:*

Be it known that I, HENRY LEEMAN, of Louisiana, in the county of Pike and State of Missouri, have invented a new and useful Improvement in Attachments to Vehicles, of which the following is a full, clear, and exact description.

My invention relates to an improvement in attachments to vehicles, adapted for use in freeing fractious or runaway animals from a vehicle; and it has for its object to provide such an attachment which will be simple, durable, economic, and capable of attachment to vehicles of any type, and, further, wherein the attachment may be safely, expeditiously, and conveniently manipulated from the body of the vehicle.

Another object of the invention is to so connect the thills with the forward axle of the vehicle that when necessary the thills may be almost instantly disconnected from the axle.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in both the views.

Figure 1:
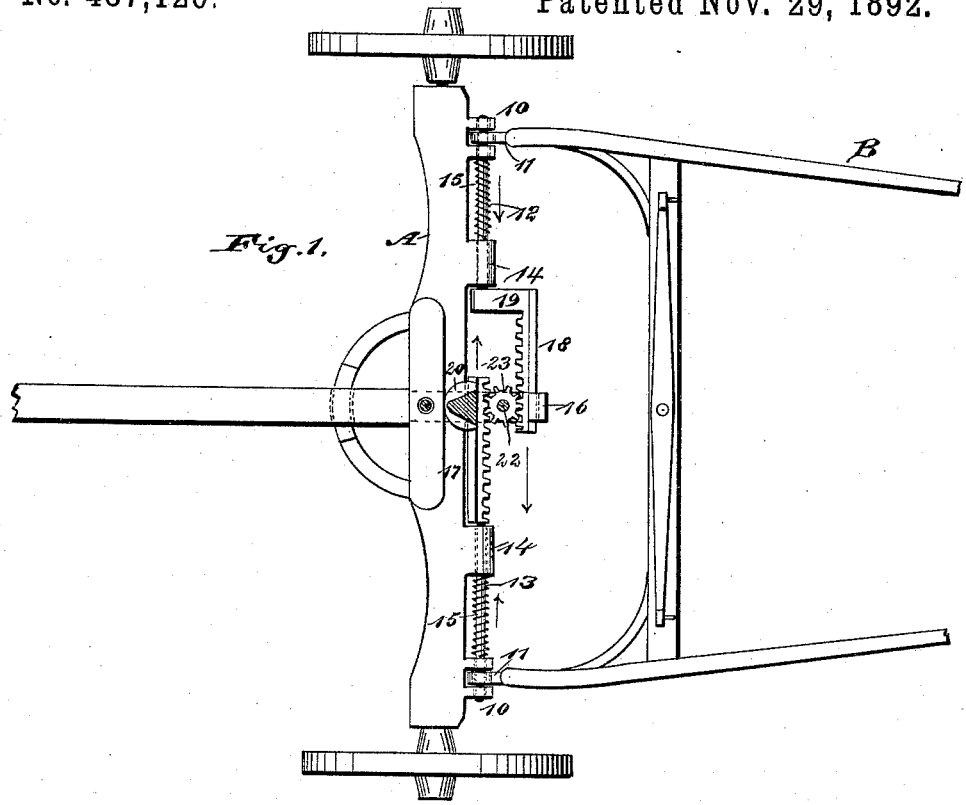
Figure 2:
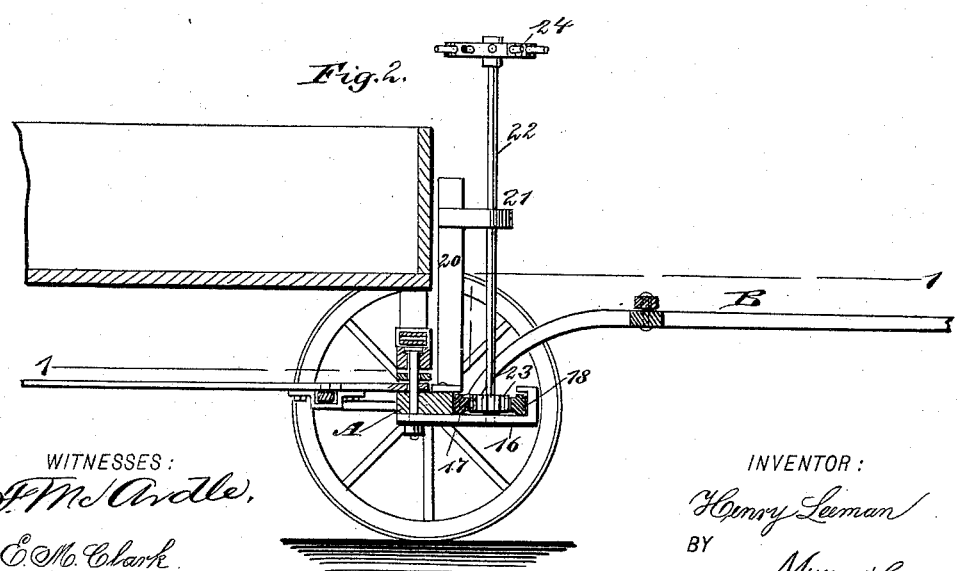

Figure 1 is a sectional plan view taken, practically, on the line 1 1 of Fig. 2; and Fig. 2 is a vertical section taken through the forward axle and thills at or near the center, the section being also taken through a portion of the body of the vehicle.

The forward axle A is provided near its ends with ears 10, in which the thill-irons 11 of the thills B are entered, and the thill-irons and ears upon the axle are held in pivotal engagement through the medium of pins designated, respectively, as 12 and 13, which pins pass through the ears and through the thill-irons and have horizontal guided movement in sleeves 14, projected from the axle at its forward edge, the sleeves being located at each side of the center of the axle. Each pin 12 and 13 is surrounded by a spring 15, and these springs have bearings at one of their ends against the sleeves 14, the other ends of the springs being attached to the pins in any suitable or approved manner adjacent to the ears 10, and the action of the springs 15 is such that they normally maintain the pins in the ears and the thill-irons and prevent them from being withdrawn, except as desired. From the forward central portion of the axle a horizontal guide-bracket 16 is forwardly projected, and this guide-bracket supports two racks 17 and 18. The racks have sliding movement in the bracket, and the rack 17, which is parallel with the axle and located close to it, forms a continuation of the pin 13, while the rack 18 is likewise parallel with the axle and is connected with the pin 12 by an arm 19, secured to the inner extremity of the pin and extending forwardly therefrom at a right angle. Thus the rack 18 is spaced some distance from the axle; but both of the racks 17 and 18 travel in parallel lines in the bracket 16. A post 20 is projected vertically upward from the central portion of the axle, and this post at or near its upper end is provided with a box or bearing 21, and a shaft 22, vertically located, is held to turn in the box 21, the lower end of the shaft being journaled in the central portion of the bracket 16 between the racks 17 and 18. The shaft is utilized for manipulating the pins 12 and 13 through the medium of their racks, and this is accomplished by securing to the lower end of the shaft a pinion 23, which meshes with both of the racks, and the upper end of the shaft has secured thereto a hand-wheel 24 or the equivalent thereof, which is within easy reach of the driver's seat and is adapted to facilitate turning the shaft.

In operation if a horse should become so fractious or unruly as to render the person driving desirous of freeing the animal from the vehicle, or in the event an animal should attempt to run away with the vehicle, by turning the hand-wheel 24 in one direction the pinions will act upon the racks 17 and 18 in such a manner as to draw the pins 12 and 13 against the tension of their springs from the thill-irons 11, thus permitting the animal to leave the vehicle and take with it the thills. The moment that the wheel is released the springs return the pins 12 and 13 to their normal or retaining position.

It is evident that this device is exceedingly simple and that at the same time it is durable and capable of being expeditiously and conveniently manipulated; further, that the device may be safely manipulated by the occupant of the driver's seat.

Having thus described my invention, I claim as new and desire to secure by Letters Patent—

In a vehicle attachment, the combination, with the forward axle provided with ears 10, between which the thill-irons fit, the sleeves 14, the guide-bracket 16, and the post 20, of the pins 12 and 13, sliding in the said sleeves, the pin 12 being provided with the arm 19, springs 15, surrounding the pins between the sleeve and ears, racks 17 and 18, sliding in the bracket and secured to the said pins, and the shaft 22, mounted in a bearing projecting from the post 20 and provided with the pinion 23, engaging the said racks, and with the handwheel 24, substantially as described.

HENRY LEEMAN.

Witnesses:
J. D. BOUMAN,
W. H. PURSE.